Jan. 2, 1968  J. L. DAUM ET AL  3,361,143
WHEEL WASHING APPARATUS
Filed Feb. 13, 1967  7 Sheets-Sheet 2

INVENTORS
John L. Daum
Roy B. Spurgin
BY
ATTORNEYS

Jan. 2, 1968   J. L. DAUM ET AL   3,361,143
WHEEL WASHING APPARATUS
Filed Feb. 13, 1967   7 Sheets-Sheet 5

INVENTORS
John L. Daum
Ray B. Spurgin
ATTORNEYS

Jan. 2, 1968   J. L. DAUM ET AL   3,361,143
WHEEL WASHING APPARATUS
Filed Feb. 13, 1967   7 Sheets-Sheet 6

INVENTORS
John L. Daum
Ray B. Spurgin
BY
ATTORNEYS

Jan. 2, 1968   J. L. DAUM ET AL   3,361,143
WHEEL WASHING APPARATUS
Filed Feb. 13, 1967   7 Sheets-Sheet 7

INVENTORS
John L. Daum
Ray B. Spurgin
BY
ATTORNEYS

United States Patent Office 3,361,143
Patented Jan. 2, 1968

3,361,143
WHEEL WASHING APPARATUS
John L. Daum and Ray B. Spurgin, Dallas, Tex., assignors to Delta Manufacturing and Engineering Corporation, Dallas, Tex., a corporation of Texas
Filed Feb. 13, 1967, Ser. No. 615,464
28 Claims. (Cl. 134—45)

ABSTRACT OF THE DISCLOSURE

A device for washing a pair of wheels of a vehicle by subjecting them to sprays of wash liquid while the pair of wheels is supported and rotated by a pair of rollers and a positioning device for arresting forward movement of the wheels to prevent them from moving past the support rollers.

---

This application is a continuation-in-part of our copending application, Ser. No. 451,568 filed Apr. 28, 1965.

This invention relates to washing apparatus and more particularly to an apparatus for washing wheels of vehicles.

An object of this invention is to provide a new and improved washing apparatus for washing the wheels of a vehicle.

An important object of the invention is to provide a wheel washing device for simultaneously washing each pair of front and rear wheels of a vehicle for a predetermined period of time.

Still another object is to provide a wheel washing device having a pair of spray means between which the pair of front and rear wheels of the vehicle may be positioned and means for rotating each pair of wheels while the sprays of wash liquid are directed on the outer sides of the wheels by the spray means.

Still another object is to provide a wheel washing device which includes control means for causing automatic operation of the spraying means of the wheel rotating means when a pair of wheels of a vehicle are properly positioned on the wheel washing device.

A further object is to provide a wheel washing device wherein one of the spray means is movable toward and away from the other whereby the device may be used to wash wheels of vehicles whose wheels are spaced apart different distances.

Another object is to provide a wheel washing device having a main frame provided with idler and drive rollers on which pairs of wheels of a vehicle may be positioned to be supported thereby and to be rotated by the drive roller, a spraying means fixed to one side of the main frame for washing the outer surface of one of the pair of wheels, a carriage mounted on the main frame and movable by the other of the pair of wheels toward or away from the fixed spraying means, and a spraying means carried by the carriage.

A further object is to provide a positioning device for a wheel washing device having a barrier bar movable into position preventing forward movement of the vehicle wheels past the idler and drive rollers as the vehicle wheels move onto the washing device.

A still further object is to provide a positioning device having means for moving it to its inoperative position, wherein it permits forward movement of the vehicle wheels off the wheel washing devices, a predetermined period of time after the positioning device has been moved to its operative position.

Another object is to provide a positioning device for a wheel washing device having operator means operable by the vehicle wheels as they move forwardly onto the idler and drive rollers of the washing machine for moving a barrier bar into its operative position preventing forward movement of the wheels off the rollers and lock means for locking the barrier bar in its operative position.

Still another object is to provide a positioning device having release means for the lock means to cause the lock means to release the barrier bar for movement to its inoperative position.

Additional objects and advantages of the invention will be readily apparent from the reading of the following description of a device constructed in accordance with the invention, and reference to the accompanying drawings thereof, wherein:

FIGURE 5-A is a schematic illustration of the control means of the wheel washing device illustrated in FIGURES 1 through 5;

Referring now to FIGURES 1 through 5 of the drawings, the wheel washing device 24 embodying the invention includes a main frame 60 having parallel rear and front side channel members 61 and 62 extending transversely of the path of travel of the vehicle through the apparatus. The bottom flanges 63 and 64 of the side channel members rest upon and are rigidly secured, as by welding, to three transverse channel shaped bottom members 66, 67 and 68. The main frame is disposed in a transversely extending upwardly opening pit or recess 70 in the concrete floor F and is secured thereto by bolts 71 whose lower ends are embedded in the floor and whose upper threaded end portions extend through suitable apertures in the bottom flanges of the bottom members. The main frame also includes a pair of bearing support channel members 73 and 74 which extend longitudinally between the side channel members adjacent opposite ends thereof and are rigidly secured thereto in any suitable manner, as by welding. A rear idler roller 75 is rotatably supported on the support members 73 and 74 by means of pillow blocks 77 and 78 rigidly secured to the support frame members, as by bolts 79, in which are rotatably journaled opposite end portions of the shaft 82 of the idler roller.

Figure 1:
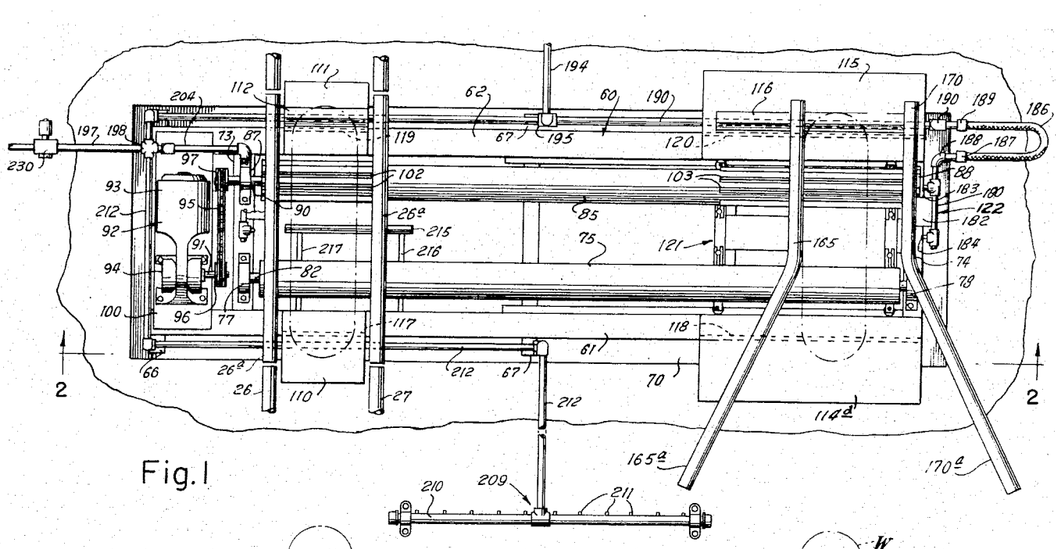
FIGURE 1 is a top view of a wheel washing device embodying the invention.
Figure 2:
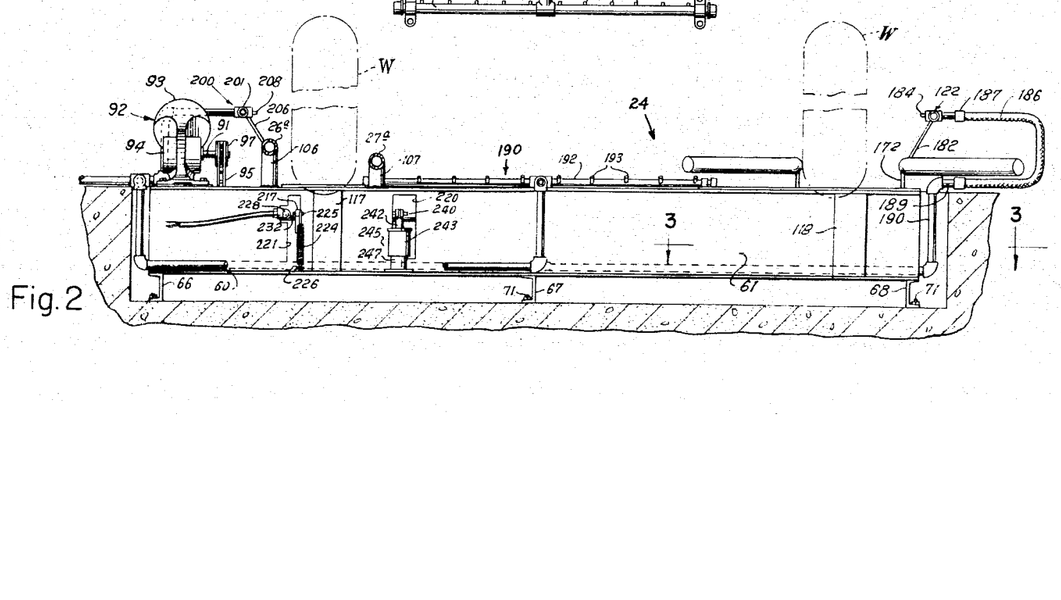
FIGURE 2 is a sectional view taken on line 2—2 of FIGURE 1.
Figure 3:
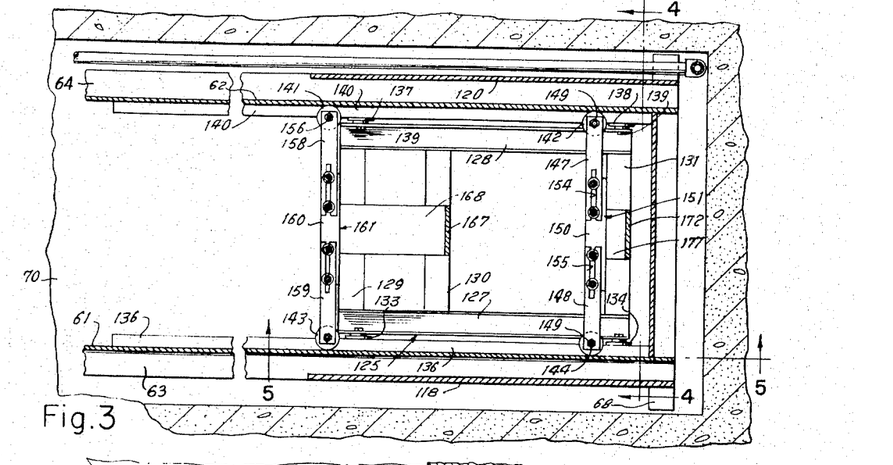
FIGURE 3 is a sectional view taken on line 3—3 of FIGURE 2.
Figures 4, 5:
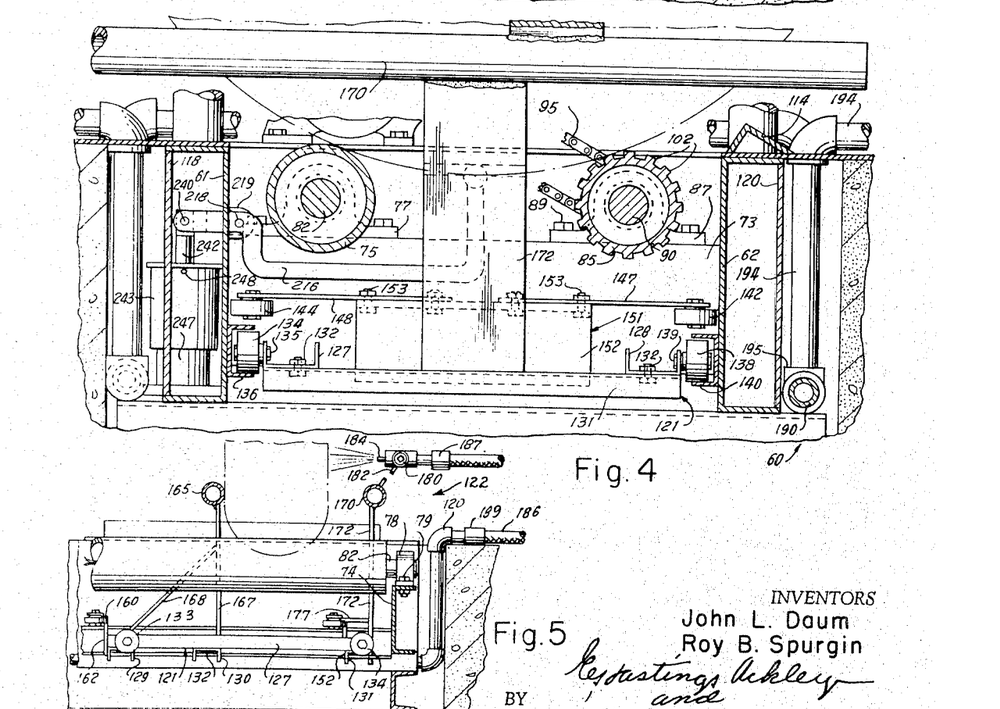
FIGURE 4 is a sectional view taken on line 4—4 of FIGURE 3.
FIGURE 5 is a sectional view taken on line 5—5 of FIGURE 3.
Figure 5:
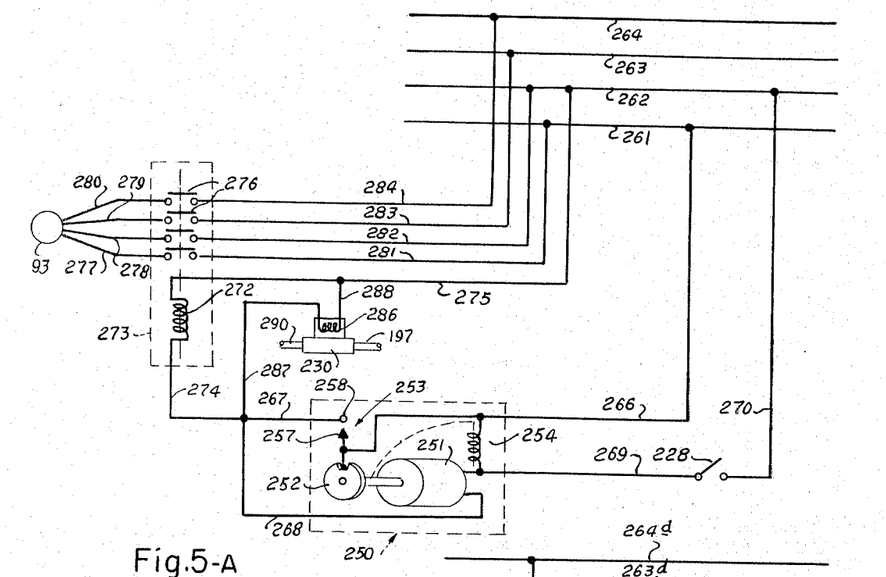

A drive roller 85 is similarly rotatably supported on the frame members forwardly of the rear idler roller by means of pillow blocks 87 and 88 rigidly secured to the frame members by bolts 89. The shaft 90 of the drive roller is rotatably journaled in the pillow blocks 87 and 88. One end portion of the shaft 90 extends through the pillow block 87. The drive roller shaft is connected to the output shaft 91 of a drive unit 92, which includes an electric motor 93 and a speed reducing device 94, by a chain 95 which extends about the sprockets 96 and 97 rigidly secured to the shafts 91 and 90, respectively. The motor and speed reducer assembly are rigidly secured as by bolts and the like to a mount plate 100 rigidly secured, as by welding, to the rear and front side frame members 61 and 62.

The drive roller 85 is radially outwardly extending ribs 102 and 103 along its opposite end portions to provide a greater frictional engagement between the drive roller and the wheels W of a vehicle when such wheels are supported by the idler and drive rollers.

A pair of tubular guide members 26a and 27a are rigidly secured to the side frame members 61 and 62 by means of posts 106 and 107, respectively. The tubular guide members constitute sections of guide rails 26 and 27 between which the left wheels of a vehicle move as the vehicle is driven to the washing device. A rear plate 110 is welded to the rear frame member 61 and bridges the gap between the top surface of the rear frame member 61 and the floor F between the guide rails.

A front plate 111 secured to the top of the front frame member 62 similarly bridges the gap between the front frame member and the floor between the guide rail. The front plate 111 has an angular member or bumper 112 rigidly secured thereto by welding. A similar rear plate 114 bridges the gap between the floor and top frame member 61 at the other end of the pit while a plate 115 mounted to the front side frame member 62 bridges the gap between the floor and the forward frame member. The front plate 115 also has an angular bumper 116 mounted thereto and disposed in alignment with the bumper 112. The bumpers 112 and 116 which are engageable by each pair of left and right wheels, respectively, of the vehicle are provided to give the driver of the vehicle an indication that the wheels of his vehicle have moved forwardly out of operative engagement with and support by the idler and drive rollers.

Vertical brace plates 117 and 118 are provided between the spaced longitudinal flanges of the rear side frame member below the plates 110 and 114 over which the wheels of the vehicle are movable. Similar vertical plates 119 and 120 extend between the spaced longitudinal flanges of the front side frame member 62.

A carriage 121, which carries a nozzle assembly 122 for directing a spray of liquid on the outer side surfaces of the right wheels of the vehicle, is mounted on the main frame 60 for transverse movement across the path of movement of a vehicle in order to position the nozzle assembly at a proper distance relative to each wheel on the right side of the vehicle when it is supported on the idler and drive rollers. The carriage includes a rectangular frame 125 having rear and front channel members 127 and 128 rigidly secured to one another by the channel members 129, 130 and 131 which the rear and front channel members abut and to which they are secured by bolts 132.

The rear frame member 127 has a pair of rollers 133 and 134 mounted thereon for rotation about horizontal axes, as by means of bolts or shafts 135. The rollers are received in an inwardly opening channel shaped track 136, rigidly secured as by welding to the rear main frame member 61. The front frame member 128 has a similar pair of rollers 137 and 138 rotatably mounted thereon by bolts or shafts 139 for rotation about horizontal axes and received in an inwardly opening channel shaped track 140 rigidly secured to the main front member 62. The rollers 133 and 134 and the rollers 137 and 138 are supported by and roll on the bottom horizontal flanges of the tracks 136 and 140.

The carriage is held against forward movement relative to the main frame by rollers 141 and 142 which engage the web of the front main frame member 62 and against rearward movement relative thereto by the rollers 143 and 144 which engage the web of the rear main frame member 61.

The rollers 142 and 144 are mounted for rotation about vertical axes on the outer ends of horizontal bars 147 and 148, as by bolts 149. The bars 147 and 148 are rigidly secured to the horizontal flange 150 of an angle bracket 151, whose vertical leg 152 is rigidly secured to the member 131 as by welding, by means of bolts 153 which extend upwardly through suitable apertures in the horizontal flange and elongate slots 154 and 155 of the bars 147 and 148, respectively. The inner rollers 141 and 143 similarly are rotatably mounted, as by bolts 156, to the outer ends of flat bars 158 and 159 whose inner end portions rest upon and are rigidly secured to the horizontal flange 160 of an angle bracket 161 whose vertical flange 162 is rigidly secured to the frame member 129.

It will be apparent that the position of the front rollers 141 and 142 and rear rollers 143 and 144 may be adjusted by adjusting the position of the bars on which they are mounted relative to the brackets 151 and 161.

An inner horizontal guide rail 165 located above the idler and drive rollers is mounted on the carriage by means of vertical planar post 167 whose lower end is rigidly secured as by welding to the inner brace member 130 of the carriage and which extends upwardly between the idler and drive rollers. A brace 168 which extends from the inner frame member 129 to the post 167 is rigidly secured thereto by welding. An outer horizontal guide rail 170 is mounted on the carriage by means of a vertical planar post 172 whose lower end is welded to the carriage frame member 131 and which also extends upwardly between the idler and drive rollers. A brace plate 177 connects the bracket 151 with the post 172.

The nozzle assembly 122 includes a conduit or pipe 180 rigidly secured to the upper end of a planar bracket 182 whose lower end is rigidly secured as by welding to the outer guide rail 170. The guide rails 165 and 170 of the carriage have rearwardly divergent end portions 165a and 170a which are engageable by the wheel at the right side of a vehicle to move the carriage to the left or the right if the carriage is not properly aligned with the right wheels of a vehicle whose left wheels are between the guide rails 26 and 27. A pair of nozzles 183 and 184 are mounted in the pipe 180 through which liquid under pressure from the pipe 180 is directed at the outer sides of a wheel when the wheel is supported by the idler and drive rollers. The liquid under pressure is supplied to the pipe 180 through a flexible conduit 186 which is connected to one end of the pipe 180 by a suitable fitting 187 and elbow 188 and whose other end is similarly secured by a fitting 189 to a pipe 190 which has a horizontal portion resting on and secured to, in any suitable manner, the forward end portions of the main base support members 66, 67 and 68.

A front nozzle assembly 191 includes a pipe 192 mounted on the floor F forwardly of the pit 70 having a plurality of nozzles 193 for directing a spray of liquid at the front end of a vehicle when its front wheels are resting on and are supported by the idler and drive rollers. The front nozzle pipe is provided with liquid under pressure from the conduit 190 through a conduit 194 which is connected to the conduit 190 by a T-coupling 195. The pipe 190 is connected to a liquid supply pipe 197 by a four way coupling 198. The spray from the nozzles of the pipe 192 is directed at the rear portion of the bottom surface of the vehicle when the back wheels of the vehicle are supported by the idler and drive rollers.

A nozzle assembly 200 for washing the left wheels of the vehicle includes a conduit or pipe 201 to which water from the inlet pipe 197 is delivered through a pipe 204 which is also connected to the coupling 198. The pipe is rigidly mounted on the guide rail 26a by a bracket 206 and has a pair of nozzles 208 which deliver a spray to the outer side of the left wheel of a vehicle when it is supported by the idler and drive rollers.

A rear nozzle assembly 209 includes a pipe 210 mounted on the floor rearwardly of the pit 70 and having a plurality of nozzles 211 which direct a spray of liquid upwardly and forwardly at the front portion of the bottom surface of the vehicle when its front wheels are supported on the idler and drive roller and at the rear surfaces of the vehicle when the rear wheels are supported by these rollers. Liquid under pressure is delivered to the nozzle pipe 210 through a conduit 212, sections of which extend through the pit, which is also connected to the common pipe coupling 198.

It will be apparent that whenever the supply pipe 197 is connected to a source of liquid under pressure, sprays of the liquid will be ejected through the nozzles of the pipes 180, 192, 201 and 210.

A feeler bar 215 is pivotally secured to the rear main frame member 61 by arms 216 and 217 pivotally secured intermediate their ends by pivot pins 218 to the brackets 219 rigidly secured, as by welding, to the web of the frame member 61. The rear end portions of the arms 216 and 217 extend rearwardly of the web of the main rear frame member through the slots 220 and 221 thereof. The feeler bar is biased upwardly between the idler and drive rollers by a tension spring 224 whose upper hook end portion is secured to the rear end of the arm 217, as by a pin or bolt 225 and whose lower hook end portion engages a bracket 226 rigidly secured as by welding to the bottom horizontal flange of the main frame member 61.

A mercury switch 228, which controls the operation of the motor 93 and of a valve 230 which controls flow of liquid through the supply pipe 197, is mounted on the arm 217 by a bracket 232 and closes to open the valve 230 and connect the motor 93 to a source of electric current when the feeler bar is depressed by the movement of a wheel onto the idler and drive rollers 75 and 85.

The bifurcated rear end of the other arm 216 is pivotally connected by a pivot pin 240 which extends through suitable apertures in the arm 216 and the upper end portion of a rod 242 of the upper telescoping cylinder 243 of a dash pot assembly 245. The upper cylinder 243 telescopes over a cylinder 247 rigidly mounted as by welding on the lower horizontal flange of the main frame member 61. The dash pot assembly functions in the usual well known manner to slow down the upward movement of the feeler bar when the wheel moves forwardly off the idler and drive rollers and thus permits the pivot bar to be moved upwardly by the spring 224. Entry of air into the dash pot formed by the two cylinders 243 and 247 whose top and bottom ends are closed is very slow due to the close fit of the upper cylinder 243 on the cylinder 247. A very small orifice 248 in the upper cylinder may be provided to permit flow of air into and out of the chamber formed by the two cylinders.

Operation of the wheel washing device 24 is controlled by a control means which includes a timer device 250 whose operation is initiated each time the switch 228 is closed. The timer device 250 may be of the type commercially available as Model 10336, Synchronous Motor Reset Timer from Cutler Hammer Company of Milwaukee, Wisconsin, and includes a synchronous motor 251 which drives a cam 252 which closes a switch 253 and a reset solenoid 254 whose armature (not shown) at the time of its energization moves the cam 252 to position wherein it holds the movable contact 257 of the switch 253 in engagement with its stationary contact 258. The switch 253 when in its closed position connects the synchronous motor 251 across the main conductors 261 and 262 of a three-phase alternating current input circuit, which also includes main conductors 263 and 264, through the conductors 266, 267, 268 and 269, the mercury switch 228 when it is closed, and the conductor 270. The reset solenoid 254 is connected across the main conductors 261 and 262, as soon as the mercury switch 228 closes, through the conductors 266, 269 and 270. The switch 253 when closed also connects the winding 272 of a contactor 273, which connects the three phase alternating current motor 93 across the main conductors 261–264, by means of the conductors 266, 267, 274 and 275. The contactor may be of any suitable type having four contacts 276 which are moved to their closed positions when the contactor winding 272 is energized to connect the motor input terminals 277, 278, 279 and 280 to the conductors 281, 282, 283 and 284, respectively, which in turn are connected to the main conductors 261, 262, 263 and 264, respectively. The switch 253 when it is closed also connects the winding 286 of the solenoid valve 230 across the conductors 261 and 262 through the conductors 266, 267, 287, 288 and 275. The inlet pipe 197 is connected by the means of the valve 230 to a conduit 290 connected to a source of hot wash liquid under pressure so that each time the solenoid valve winding 286 is energized and the valve 230 is opened, hot wash liquid under pressure is delivered to the pipe 197.

The timer motor remains energized until the cam 252 is rotated through a predetermined angle and, since the motor is of a synchronous type, therefore for a predetermined period of time, for example 15 seconds. At the end of this period of time the cam causes the switch 253 to open even though the mercury switch 228 is still closed since the solenoid 254 must be de-energized, as by opening the switch 228, and then again be energized to again move the cam 252 to the position wherein it initially closes the switch 253.

In use, as a vehicle moves forwardly toward the wheel washing device, its left wheels of the vehicle are guided between the guide rails 26 and 27 and as its right front wheel moves between the divergent end portions 165a and 170a of the wheel washing device, if the carriage is not properly aligned with the right front wheel, the right front wheel engages one of the end portions 165a or 170a and moves the carriage to proper alignment with the right front wheel. As the front wheels of the vehicle move onto the idler and drive rollers 75 and 85, respectively, of the wheel washing device, the feeler bar 215 is depressed and as it moves downwardly causes the mercury switch 228 to close. Closing of the switch 228 now causes the reset solenoid 254 of the timer device 250 to be connected across the main conductors 261 and 262 and the energization of the reset solenoid winding 254 causes the cam 252 to be moved to the position where it closes the switch 253. Closure of the switch 253 now causes the timer motor 251 to be energized and the timer motor proceeds to rotate the cam 252. When the switch 253 is closed, the contactor winding 272 is energized and moves its contacts 276 to their closed positions, the motor 93 is energized and rotates the drive roller 85 which in turn rotates the front wheels of the vehicle. Simultaneously, the closure of the switch 253 also causes energization of the winding 286 of the solenoid valve 230 so that the valve 230 opens and hot wash liquid is supplied to the two nozzle assemblies 122 and 200 at the outer side surfaces of the rotating front wheels to wash off any dirt adhering to these surfaces of the front wheels. A spray of hot wash liquid from the front nozzle assembly 191 is directed at the front surfaces of the vehicle while the spray from the rear nozzle assembly 206 is directed at the forward portions of the bottom surfaces of the vehicle.

The motor 93, the solenoid winding 286 of the solenoid valve 230, and the timer motor 251 will now remain energized for a predetermined period of time, for example, 15 seconds, predetermined by the configuration of the cam 252 and the speed of rotation of the shaft of the timer motor. When a predetermined period of time elapses, the cam 252 causes the switch 253 to open thus stopping operation of the timer motor 251 and de-energizing the contactor winding 272 and the valve solenoid winding 286 thus causing the motor 93 to stop running and stopping the delivery of wash liquid under pressure to the two nozzle assemblies.

The driver now drives the vehicle forwardly and until the rear wheels move onto the wheel washing device 24 whereupon the closure of the mercury switch 228 and energization of the reset solenoid 254 again causes the switch 253 to be closed, the motor 93 to be energized and the valve 230 to be opened. The rear wheels are now washed with the spray of wash liquid from the nozzle assemblies 122 and 200 while the rear surfaces of the automobile are sprayed with the upwardly directed spray of wash liquid from the nozzle assembly 209 and the rear portions of the bottom surfaces of the automobile are subjected to the spray of water from the nozzle assembly 191. This second operation of the wheel washing device continues for 15 seconds, at the end of which time the switch 253 is again opened, the motor 93 is de-energized and the valve 230 is closed. The driver may now drive the vehicle from the vehicle washing device and, if desired, to another washing apparatus which will wash the body of the vehicle.

It will now be seen that a new and improved wheel washing device has been illustrated and described which subjects the outer surfaces of the wheels of the vehicle to a spray of liquid under pressure, the liquid preferably being hot and having a wash agent, such as a detergent or soap dissolved therein, while the wheels are supported by the idler and drive rollers and are rotated thereby.

It will further be seen that the wheel washing device operates for a predetermined period of time, during which the vehicle wheels are rotated and a liquid is sprayed at relatively high velocity at the outer side surfaces of the vehicle wheels, after the wheels have moved onto the vehicle washing device and that the operation of the vehicle washing device is automatically stopped after such predetermined period of time.

It will further be seen that the wheel washing device may also include front and rear nozzle assemblies for directing sprays of liquid at the bottom surfaces of the vehicle and thus wash off dirt, mud, salt and the like from the bottom surfaces of the vehicle which tend to corrode the metal, this washing being especially beneficial in areas where salt has been sprinkled on streets and highways to prevent formation of ice thereon.

It will further be seen that the operation of the wheel washing device is substantially fully automatic the driver of the vehicle merely being required to drive the vehicle onto the device, to stop the vehicle when its front and rear wheels successively move onto the wheel washing device and are washed thereby, and then drive the vehicle forwardly after each pair of wheels is washed.

Referring now particularly to FIGURES 6 through 13, the vehicle washing device 24d of preferred form and embodying the invention is illustrated which is similar to the vehicle washing device 24, and, accordingly, elements of the vehicle washing device 24d have been provided with the same reference numerals, to which the subscript "d" has been added, as the corresponding elements of the vehicle washing device 24.

Figure 13:
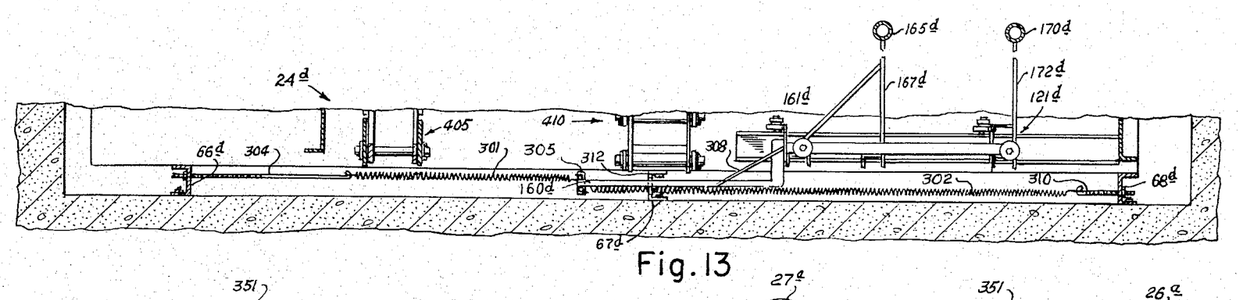
FIGURE 13 is a fragmentary sectional view taken on line 13—13 showing the means for biasing the carriage to its intermediate position.

The carriage 121d of the device 24d is biased toward an intermediate position relative to the main frame 60d by a pair of springs 301 and 302. The spring 301 has one hooked end connected to a hook 304 whose threaded shank extends through an aperture in the web of the transverse channel member 66d and is secured against inward movement relative to the frame by a nut threaded thereon and its other hooked end is secured to a pin 305 carried by a bracket 160d rigidly secured, as by welding, to the bracket 161d of the carriage. Brace members 308 for the bracket may extend between the bar and the bracket and are rigidly secured thereto as by welding. The other spring 302 similarly has one hooked end connected to the pin 305 and its other hooked end connected to a hook 310 whose threaded shank extends through suitable aperture in the flange of the transverse channel member 68d and is secured against inward movement by a nut threaded on its outer end. The middle transverse channel member 67d has an upwardly opening slot 312 in its upper portion to permit the springs to extend therepast.

Figures 7, 14:
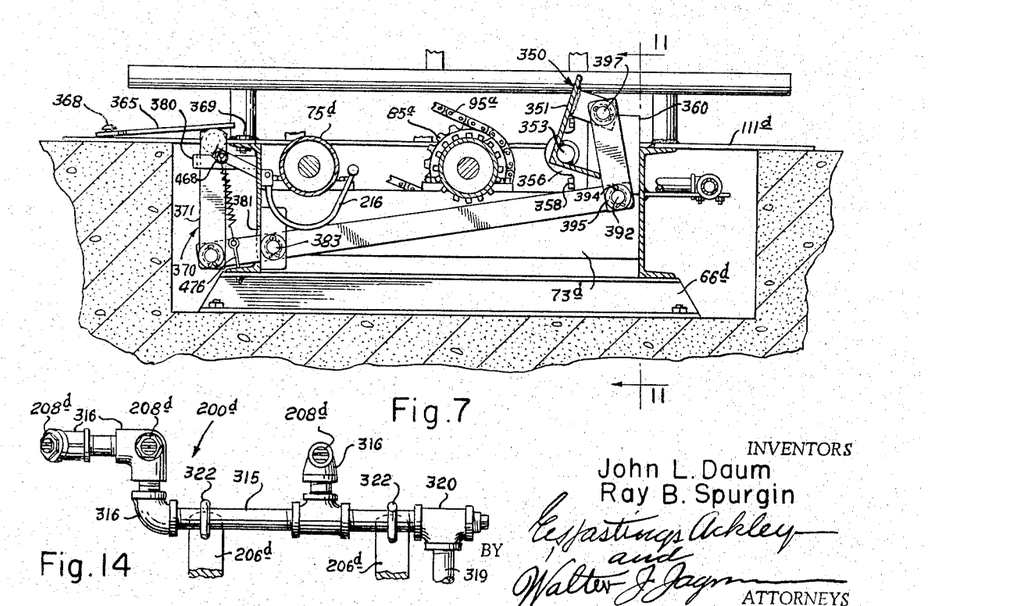
FIGURE 7 is a sectional view, with some parts broken away, taken on line 7—7 of FIGURE 6.
FIGURE 14 is a view of one of the nozzle assemblies of the washing device illustrated in FIGURES 6 through 13; and, FIGURE 15 is a schematic illustration of the control means of the wheel washing device illustrated in FIGURES 6 through 10.

The left nozzle assembly 200d includes three nozzles 208d connected by suitable nipples 315 and elbows 316. Wash liquid under pressure is delivered to the left nozzle assembly 200d from the inlet pipe 197d through a T-coupling 318 and pipe 319 which is connected to the T-fitting 320 of the nozzle assembly. The nozzle assembly is secured to the guide rail section 26ad by a pair of arms 205d which extend outwardly and upwardly from the guide rail section 26ad and U-bolts 322 which extend about the nipples of the nozzle assembly.

The carriage nozzle assembly 122d similarly includes three nozzles 183d which direct sprays of wash liquid at the outer side of the right wheel of the vehicle supported by the idler and drive rollers and is rigidly secured to the guide rail 170d of the carriage by arms 207d whose inner ends are welded to the guard rail and U-bolts 324 which extend about the nipples of the nozzle assembly. The wash liquid from the inlet pipe 197d is delivered to the nozzle assembly 206d by means of the T-fitting 325, a flexible hose 186d which is connected by suitable fittings to the T-coupling and a pipe assembly 326 which is connected to the T-coupling 318.

Figure 6:
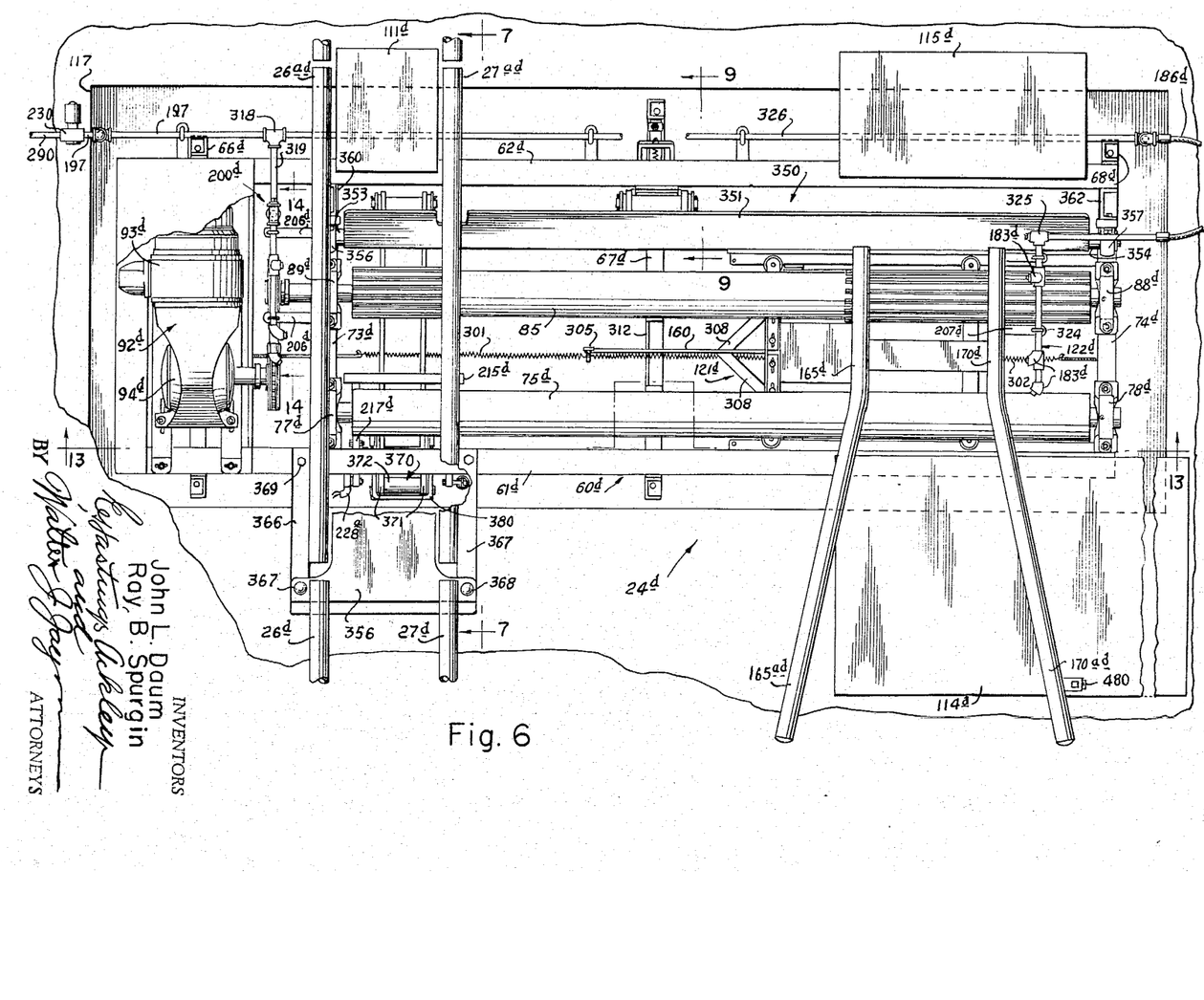
FIGURE 6 is a top view, with some parts broken away, of a preferred form of the wheel washing device and of the positioning device embodying the invention, the positioning device being shown in its operative position.
Figure 8:
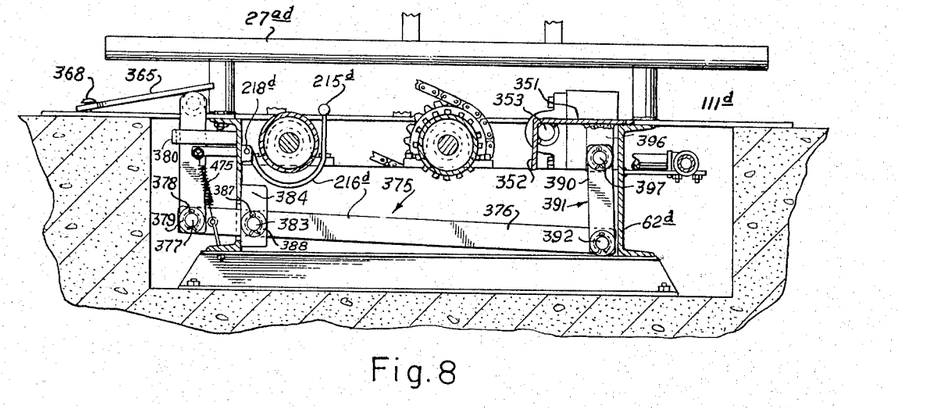
FIGURE 8 is a sectional view, similar to FIGURE 7, showing the positioning device in its inoperative position.
Figure 10:
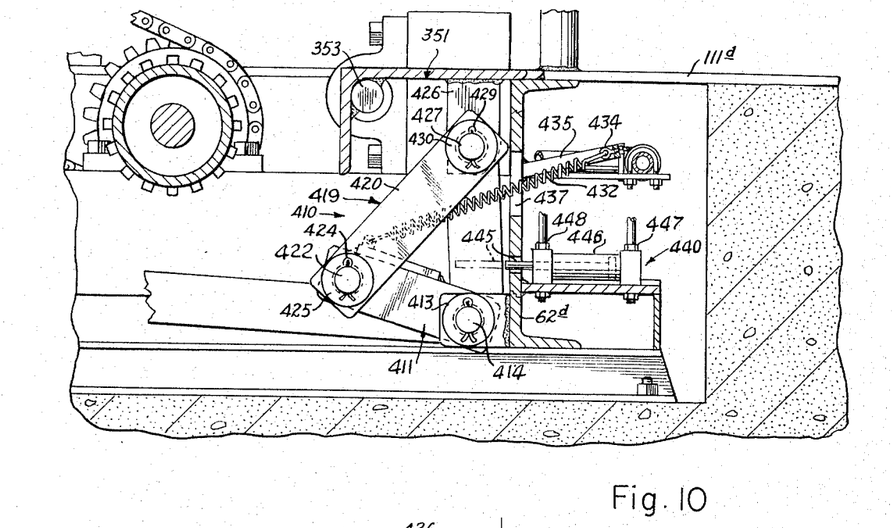
FIGURE 10 is a view similar to FIGURE 9 showing the positioning device in its inoperative position.
Figure 11:
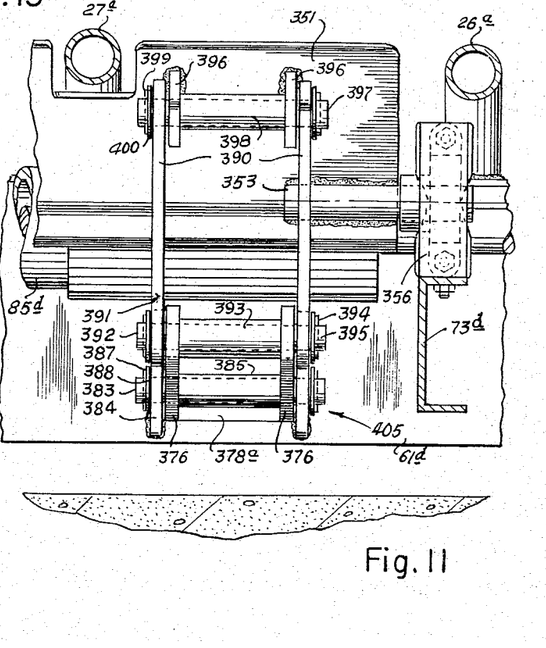
FIGURE 11 is a fragmentary sectional view taken on line 11—11 of FIGURE 7.
Figure 12:
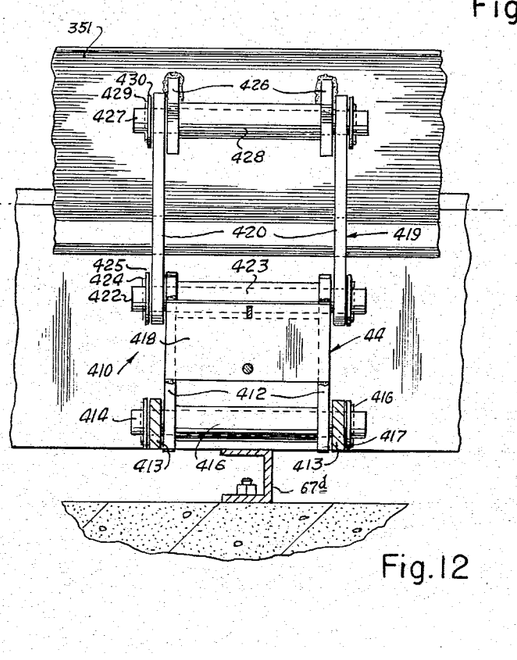
FIGURE 12 is a fragmentary sectional view taken on line 12—12 of FIGURE 9.

The wheel washing device 24d does not have bumpers 112 and 116 on its bridge plates 111a and 115a, as in the case of the device 24, to provide the driver with an indication that the wheels of his vehicle are properly positioned on the device to be washed thereby but instead is provided with a positioning device 350 which includes a barrier bar 351 movable between the operative position illustrated in FIGURE 6 wherein it prevents forward movement of the wheels of the vehicle immediately after the have moved onto the wheel washing device and are in position to be washed and the inoperative position illustrated in FIGURES 8 and 10 to which it is moved a predetermined period of time after the wheels have moved onto the support and idler rollers.

The barrier bar 351 when in its inoperative position is horizontal and its front edge portion rests on the front side channel member 62d immediately rearwardly of the bridge plate 111d. The bar has a perpendicular flange 352 and end shafts 353 and 354 rigidly secured to the bar and the flange by welding and rotatably received in pillow blocks 356 and 357, respectively. The left pillow block 356 is secured by bolts 358 to the rear flange of a vertical channel member 360 secured to the channel member 73d by welding. The right pillow block 357 is similarly secured to the rear flange of a channel member 362 which is secured to the channel member 74d.

The barrier bar is movable from its inoperative position to its operative position when a wheel of a vehicle moves over a treadle 365 which is movably secured for limited pivotal movement to the rear ends of parallel plates 366 and 367 by means of headed studs 368 which extend through suitable apertures in the treadle. The bars 366 and 367 are secured to the rear side channel member 61d by means of bolts 369. The forward end of the treadle engages the top end of a pivot arm 370 including a pair of parallel bars 371 and a tubular spacer member 372 and 373 which extends between and are rigidly secured to the top ends of the bars 371. The lower end of the pivot arm 370 is pivotally secured to the rear end of a lever 375 which includes a pair of parallel bars 376 by a shaft 377 which extends through aligned apertures of the arm and lever bars and a lower spacer member 378a which extends between the rear end of the lever bars and may be secured thereto by welding. The shaft is secured to the arm and lever by cotter pins 378 and washers 379 on the shaft located outwardly of the pivot arm bars 371. Rearward movement of the pivot arm is limited by its engagement with a U-shaped bracket 380 which is secured by welding to the web of the rear channel member 61d and its forward movement is limited by its engagement with the top flange of the rear channel member 61d. The lever 375 extends forwardly through a suitable aperture or slot 381 in the web of the channel member 61d and is pivotally secured thereto intermediate its ends by means of a shaft 383 which extends through aligned apertures in the lever bars 376 and brackets 384 which are welded to the side channel member and a spacer member 385 which extends between the lever bars and may be secured thereto by welding. The shaft 383 is held in place by cotter pins 387 and washers 388 disposed on the shaft outwardly of the brackets 384. The front ends of the lever bars extend between and are connected to the lower end of the bars 390 of a link 391 by a shaft 392 which extends through suitable aligned apertures of the lever and links bar and a tubular spacer member 393 which extends between the link bars and may be rigidly secured thereto by welding. The shaft 393 is retained in place by cotter pins 394 and washers 395 disposed on the shaft outwardly of the link bars. The upper ends of the link bars are pivotally secured to lugs 396 welded to the barrier bar by a shaft 397 which extends through aligned apertures in the lugs and the link bars and a tubular spacer member 398 located between and secured to the lugs by welding. The shaft 397 is held against displacement thereby by cotter pins 399 and washers 400 disposed on the shaft outwardly of the link bars.

It will be apparent that the treadle, the pivot arm 370, the lever 375, the link 391 and the shafts pivotally connecting the lever to the pivot arm, the frame channel member 61d, the link, and the shaft connecting the link to the lugs of the barrier bar constitute an operator means 405 for moving the barrier bar between its operative and inoperative positions. The distribution of the weight of these various elements of the operator means and of the barrier bar relative to the axes of pivotal connections of the lever and the barrier bar is such that the barrier bar, if not held in its operative position by a lock means 410, would be moved by gravity to its inoperative position, it being apparent that the moment arm between the axes of the shafts 377 and 383 is much shorter than the moment arm between the axes of the shafts 383 and 392 and that the center of gravity of the barrier bar when in its operative position is located forwardly of the axis of its pivotal connection to the frame.

The lock or latch means 410 includes a lower link 411 having a pair of parallel bars 412 which is pivotally secured at its lower end to a pair of rearwardly extending lugs 413 welded to the web of the front side channel member 62d by a shaft 414 which extends through aligned apertures of the link bars and the lugs and through a spacer sleeve 415 disposed between the lower ends of the link bars which may be rigidly secured thereto by welding. The shaft is secured against displacement by cotter pins 416 and washers 417 disposed on the shaft outwardly of the lugs. The lower link includes a striker plate 418 extending between its bars and welded thereto.

The lower link 411 is connected to an upper link 419 having a pair of bars 420 connected at their lower ends to the upper ends of the lower link bars by a shaft 422 which extends through aligned apertures in the bars of the lower and upper links and a spacer sleeve or member 423 disposed between the upper ends of the lower link bars and secured thereto by welding. Cotter pins 424 and washers 425 disposed on the shaft outwardly of the upper link bars hold the shaft against displacement. The upper ends of the upper link bars are pivotally secured to a pair of lugs 426, welded to the barrier bar, by a shaft 427 which extends through aligned apertures in the bars and lugs and a spacer sleeve or member 428 disposed between and secured to the lugs. The shaft is held against displacement by cotter pins 429 and washers 430 disposed on the shaft outwardly of the upper link bars.

A spring 432 biases the connected ends of the links 411 and 419 forwardly, its rear hooked end being secured to the striker plate 418 by a lug 433 integral with the striker plate and its front hooked end being secured to an eye-bolt 434. The bolt is secured to a U-shaped bracket 435 welded to the web of the front side channel member 62d, the spring extending through a slot 437 of the channel member.

Figure 9:
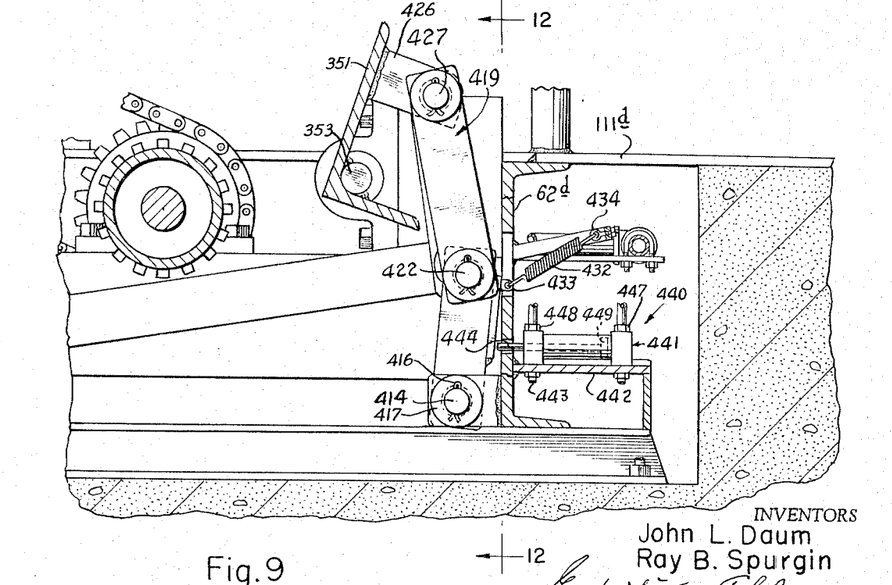
FIGURE 9 is a sectional view, with some parts broken away, taken on line 9—9 of FIGURE 6.

When the barrier is in its operative position illustrated in FIGURE 9, the lock means holds it locked against movement toward its inoperative position since the axis of the middle shaft 422 is disposed forwardly of the plane in which lie the axes of the bottom and top shafts 414 and 419, respectively, and forward and downward movement of the connected ends of the two links is prevented by the engagement of the striker plate with the web of the front side channel member 62d.

A release device or means 440 for moving the connected ends of the links 411 and 419 of the latch means rearwardly and past the plane in which lie the axes of their pivotal connections to the frame and the barrier bar, respectively, includes a hydraulic or pneumatic ram 441 secured to a suitable mount plate 442, welded to the front side channel member 62d, by means of threaded studs 443 thereof which extend downwardly through apertures of the mount plate and nuts threaded thereon. The piston rod 444 of the ram extends rearwardly through a suitable aperture 445 in the front side channel member and when fluid under pressure is admitted to one of the cylinder 446 of the ram through its fitting 447 and the cylinder is vented at its other end through its fitting 448, the piston 449 moves rearwardly and the piston rod strikes the striker plate and moves the lower link 411 rearwardly and in a counterclockwise direction about the axis of its shaft 414 and the upper link 419 rearwardly and in a clockwise direction about the axis of its shaft 427. When the axis of the shaft 422 moves rearwardly of the plane in which the axes of the bottom and top shafts 414 and 427 lie, the weight of the bar, of the operating means and of the lock means is effective to move the bar downwardly to its inoperative position against the resistance of the spring 432 of the locking means. The spring is provided to insure that the links 411 and 419 are moved to and are held in their locked positions illustrated in FIGURE 9 when the barrier bar is moved to its operative position even though vibrations may be imparted to the bar and the locking means due to the engagement of vehicle wheels with the barrier bar if the driver inadvertently drives forwardly and then rearwardly while the barrier bar is in its operative position.

Figure 15:
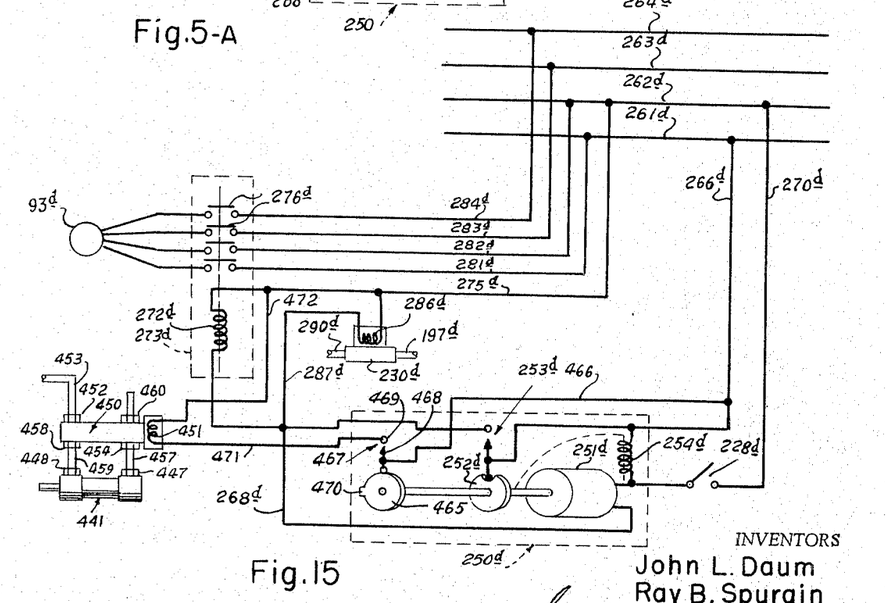

Operation of the ram is controlled by a control means which includes a suitable four-way solenoid valve 450, which may be of a type commercially available and which, when its winding 451 is energized, causes fluid under high pressure from a suitable source, to which its inlet fitting 452 is connected by suitable conduit means 453, to flow to its fitting 454 which is connected to the ram cylinder fitting 447 by a conduit 457 and simultaneously causes the ram cylinder fitting 448 which is connected to the valve fitting 458 by a conduit 459 to be placed in communication with its vent fitting 460. As a result, since the fluid in the ram cylinder may escape from the cylinder through the fitting 448 while fluid under pressure is introduced to its inlet fitting 447, the piston is moved rearwardly to its extended operative position and moves the lock means to its released or inoperative position.

When the winding 451 of the valve 45 is de-energized, the fitting 458 of the valve is placed in fluid communication with its inlet fitting 452 and simultaneously fluid communication is established between its fittings 454 and 460 so that fluid under pressure communicated to the ram cylinder through its fitting 448 moves the piston to its retracted position and fluid is permitted to escape from the ram cylinder through its fitting 447 to permit such movement of the piston.

The energization of the winding 451 of the valve is controlled by a second cam 465 of the timer device 250d which connects the winding 451 across the main conductors 261d and 262d through the conductors 266d and 466, a switch 467 whose movable contact 468 is moved into engagement with its stationary contact 469 when the outward protrusion 470 of the cam 465 moves it upwardly, and the conductors 471, 472 and 275d.

The switch 228d is mounted on the arm 217d of the feeler bar 215d which is biased in a counterclockwise direction about its pivot pins 218d by a spring 475 whose lower end is secured to an eye-bolt 476 secured to the bottom flange of the rear side channel member 61d and whose top end is secured to a ring 468 secured to the rear end of the feeler bar arm 216d. The feeler arm bars extend rearwardly through suitable apertures in the web of the rear side channel member 61d.

A suitable wheel 480 may be rotatably secured to the rear end portion 170ad of the guide rail to help support the rail. The wheel 480 preferably rolls along the bridge plate 114d.

In use, as the vehicle whose front and rear wheels are to be washed by the wheel washing device 24d is driven forwardly, if its wheel span is greater than that of most types of vehicles, its right front wheel as it enters between the rear end portions of the guide rails 165d and 170d will engage the rear end portion 170ad of the right carriage guide 170 and the carriage will then be moved to the right. If its wheel span is shorter than that of most types of vehicles its front right wheel will engage the rear portion 165ad of the left guide rail of the carriage and the carriage will be moved to the left due to the engagement of the right wheel with the guide rail as the wheel moves forwardly and onto the idler and drive rollers. As the vehicle is driven forwardly with its left front wheel between the guide rails 26d and 27d, its right front wheel will move between the carriage guide rails and then the front right wheel will move onto the rear ridge plate 114 and the left front wheel will move onto the treadle 356. The weight of the vehicle will now move the treadle downwardly and the operating means 405 will cause the barrier bar 351 to pivot in a counterclockwise direction about the axis of its shafts 353 and 354 from the inoperative position illustrated in FIGURES 8 and 10 to the operative position illustrated in FIGURES 6, 7 and 9.

As the barrier bar moves to its operative position, the links 411 and 419 of the locking means move to the locking position illustrated in FIGURE 9 and lock the barrier bar against movement from its operative position and hold it there even after the left wheel moves off the treadle.

Continued forward movement of the vehicle then causes the wheels to roll over the rear idler roller 75d and into engagement with the idler roller and the support roller 85d. As the left wheel thus moves to a position wherein it is supported by the idler and drive rollers, it engages the feeler bar 215d and pivots it in a clockwise manner about the axis of its pivot pins 218d, FIGURE 7, thus causing the switch 228d to close. If the driver inadvertently continues to drive the vehicle forward the front wheels engage the barrier bar 351, and thus stop such forward movement of the wheel and the driver will realize that he has driven too far forwardly. The feeler bar in its normal inoperative position extends sufficiently above the level of the rollers that it will remain in at least partially depressed position when the left front wheel is in engagement with the barrier bar so that the switch 228 will remain closed even through it is then positioned forwardly of its proper position on the idler and driver rollers. As soon as the switch 228d is thus closed, the reset solenoid 254d of the timer device 250d is energized and rotates the shaft of the synchronous motor 251d through an angle sufficient to cause the cam 252d to close the switch 253d. As a result, the contactor winding 272d and the valve winding 286d are energized so that the motor 93d is energized and the valve 230d is opened.

The motor 93d now causes rotation of the driver roller and the front wheels are rotated while they are washed by the sprays of liquid delivered by the nozzle assemblies 122d and 200d. A predetermined period of time after the commencement of operation of the washing operation of the front wheels, and preferably before such operation is completed, the protrusion 470 of the cam 465 closes the switch 467 and the winding 451 of the four-way valve 450 is energized causing the piston of the ram to move toward extended position and its piston rod forceably strikes the striker plate. The piston moves the connected ends of the links 411 and 419 of the locking means 410 rearwardly so that the axis of the middle shaft 422 which connects th two links moves rearwardly of the plane in which lie the axes of the bottom and top shafts 414 and 427 and the barrier bar is moved by gravity to its inoperative position. As the motor 251d continues to run, the switch 467 again moves to its open position and the solenoid winding 451 is de-energized and fluid under pressure is admitted by the valve to the ram cylinder at its fitting 448 while the opposite end of the cylinder is vented so that the piston is moved back to its retracted inoperative position. The operation of the driving means continues until the motor 251d of the timer device again rotates its shaft to the position where the cam 252d causes the switch 253d to again move to its open position. The contactor winding 272d and the valve winding 286d are then de-energized, the motor 93d stops rotating the support driver roller and the valve 230d closes. The driver then drives forwardly, the horizontal barrier bar now partially bridging the gap between the support roller and the front side channel member to facilitate the movement of the front wheels onto the front bridge plates 111d and 115 and off the washing device. The vehicle is driven forwardly until its rear wheels move onto the washing device and the above sequence of operation of the device is repeated.

It will now be apparent that the wheel washing device 24d is provided with a positioning device or means which holds the front wheels of a vehicle against movement from proper position on the wheel washing device at the time the driver is most likely to drive too far forwardly and that such positioning or barrier means is moved to an inoperative position once the wheel washing operation has commenced.

It will further be seen that the barrier means provides a support for the wheels as they move off the support roller and onto the front bridge plates 111d and 115d.

It will further be seen that while particular electric control means for operating the two forms of the wheel washing device have been described and illustrated herein, such electric control means may constitute a portion of the control means of a washing apparatus, such as the washing apparatus illustrated in the co-pending application of John L. Daum and Ray B. Spurgin, Ser. No. 451,568, which has means for washing the other surfaces of the vehicle.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A wheel washing device including: a frame; a pair of spaced rollers rotatably mounted on said frame; drive means for rotating one of said rollers to cause rotation of a pair of wheels of the vehicle when supported by said rollers; a pair of nozzle means mounted on said frame for directing sprays of liquid on outer sides of a pair of vehicle wheels when supported by said rollers; valve means operable to permit flow and fluid under pressure to said nozzle means; and control means operatively associated with said valve means and said drive means for causing said drive means to rotate said one of said rollers and said nozzle means to direct sprays of liquid on outer side surfaces of a pair of wheels supported on said rollers, said control means including operator means engageable by a wheel of a vehicle when it is supported by said rollers for initiating operation of said drive means and causing said valve means to open and timer means for causing said drive means to operate and said valve means to remain open for a predetermined period of time each time said operator means is engaged by a wheel of a vehicle.

2. The wheel washing device of claim 1, and a positioning device for preventing forward movement of a pair of wheels from said rollers when the wheels move forwardly relative to said device and onto said rollers.

3. The wheel washing device of claim 2, wherein said positioning device includes a barrier means movable to operative position in the path of movement of a pair of wheels and means operable by the wheels as they aprpoach said rollers for moving said barrier means to said operative position.

4. The wheel washing device of claim 3 and releasable lock means for holding said barrier bar against movement from said operative position.

5. The wheel washing device of claim 4, and release means for releasing said lock means to cause said barrier means to move to an inoperative position wherein said barrier means does not prevent forward movement of a pair of wheels of said wheel washing device relative to said device and off said rollers.

6. The wheel washing device of claim 5, and timer means for causing operation of said release means a predetermined period of time after said barrier means has been moved to operative position and before cessation of operation of said drive means.

7. The wheel washing device of claim 6, wherein said lock means includes a linkage having two link means, said link means having remote ends pivotally connected to said frame and to said barrier means for pivotal movement about first and second axes and having adjacent ends pivotally connected to one another for pivotal movement about a third axis, said axes being parallel, said third axis being spaced from and on one side of a plane in which are located said first and second axes when said barrier means is in said operative position, said third axis being spaced from and on the other side of said plane when said barrier means is in said inoperative position.

8. The wheel washing device of claim 7, and means biasing said link means to position wherein said first axis is on said one side of said plane.

9. The wheel washing device of claim 8, said frame having means engageable with said link means limiting movement of said link means in a direction away from said one side of said plane when said barrier means is in said operative position.

10. The wheel washing device of claim 9, wherein said release means has means engageable with one of said link means for moving said link means toward said other side of said plane to cause said third axis to move from said one side to said other side of said link.

11. A wheel washing device including: a frame; a pair of spaced rollers rotatably mounted on said frame; drive means for rotating one of said rollers to cause rotation of a pair of wheels of the vehicle when supported by said rollers; a pair of nozzle means mounted on said frame for directing sprays of liquid on outer sides of a pair of vehicle wheels when supported by said rollers; and a positioning device for preventing forward movement of a pair of wheels from said rollers when the wheels move forwardly relative to said device onto said rollers, said positioning device including a barrier means movable to operative position in the path of movement of a pair of wheels and means operable by the wheels as they approach said rollers for moving said barrier means to said operative position.

12. The wheel washing device of claim 11, and releasable lock means for holding said barrier means against movement from said operative position, and release means for releasing said lock means to cause said barrier means to move to an inoperative position wherein said barrier means does not prevent forward movement of a pair of wheels of said wheel washing device relative to said device and off said rollers.

13. The wheel washing device of claim 12, and timer means for causing operation of said release means a predetermined period of time after said barrier means has been moved to operative position and before cessation of operation of said drive means.

14. The wheel washing device of claim 13, wherein said lock means includes a linkage having two link means, said link means having remote ends pivotally connected to said frame and to said barrier means for pivotal movement about first and second axes and having adjacent ends pivotally connected to one another for pivotal movement about a third axis, said axes being parallel, said third axis being spaced from and on one side of a plane in which are located said first and second axes when said barrier means is in said operative position, said third axis being spaced from and on the other side of said plane when said barrier means is in said inoperative position.

15. The wheel washing device of claim 14, and means biasing said link means to position wherein said first axis is on said one side of said plane.

16. The wheel washing device of claim 15, said frame having means engageable with said link means limiting movement of said link means in a direction away from said one side of said plane when said barrier means is in said operation position.

17. The wheel washing device of claim 16, wherein said release means has means engageable with one of said link means for moving said link means toward said other side of said plane to cause said third axis to move from said one side to said other side of said link.

18. A vehicle wheel washing device including: a frame; a pair of spaced rollers rotatably mounted on said frame and extending transversely across the path of movement of a vehicle; guide means engageable by wheels on one side of a vehicle for guiding movement of a vehicle to position front and rear pairs of wheels of a vehicle successively on said rollers; drive means for rotating one of said rollers to cause rotation of a pair of wheels of a vehicle when supported by said rollers; a first nozzle means rigidly mounted on said frame; a carriage mounted on said frame for movement toward and away from said first nozzle means; and a second nozzle means mounted on said carriage, said carriage having means engageable by a wheel of a vehicle for moving said second nozzle to position to direct a spray of liquid on the outer side surface of a wheel, said first nozzle means being adapted to direct a spray of liquid on outer side surfaces of a wheel engageable with said guide means; and means biasing said carriage to an intermediate position between the extreme limits of its movement.

19. The vehicle wheel washing device of claim 18, and valve means for controlling flow of liquid under pressure to said nozzle means, and control means operatively associated with said valve means and said drive means for causing said drive means to rotate said one of said rollers and sprays of liquid from said nozzle means to be directed on outer side surfaces of a pair of wheels supported by said rollers.

20. The wheel washing device of claim 19, wherein said control means includes operator means engageable by a wheel of a vehicle when it is supported by said rollers for initiating operations of said drive means and causing said valve means to open.

21. The wheel washing device of claim 20, wherein said control means includes timer means for causing said drive means to operate and said valve means to remain open for a predetermined period of time each time said operator means is engaged by a wheel of a vehicle.

22. The wheel washing device of claim 21, and a positioning device for preventing forward movement of a pair of wheels from said rollers when the wheels move forwardly relative to said device and onto said rollers.

23. The wheel washing device of claim 22, wherein said positioning device includes a barrier means movable to operative position in the path of movement of a pair of wheels and means operable by the wheels as they approach said rollers for moving said barrier means to said operative position.

24. The wheel washing device of claim 23, and releasable lock means for holding said barrier bar against movement from said operative position.

25. The wheel washing device of claim 24, and release means for releasing said lock means to cause said barrier means to move to an inoperative position wherein said barrier means does not prevent forward movement of a pair of wheels of said wheel washing device relative to said device and off said rollers.

26. The wheel washing device of claim 25, and timer means for causing operation of said release means a predetermined period of time after said barrier means has been moved to operative position and before cessation of operation of said drive means.

27. The wheel washing device of claim 25, wherein said barrier means when in said inoperative position provides a horizontal support surface for vehicle wheels as they are moved forwardly off the wheel washing device.

28. The wheel washing device of claim 12, wherein said barrier means when in its inoperative position provides a horizontal support surface for vehicle wheels as they move forwardly from said idler and support rollers after the wheels have been washed.

References Cited
UNITED STATES PATENTS

| | | | |
|---|---|---|---|
| 2,692,214 | 10/1954 | Hurst | 134—123 X |
| 2,807,271 | 9/1957 | Spinner | 134—45 |
| 2,910,202 | 10/1959 | Clarke et al. | 134—45 X |
| 2,957,195 | 10/1960 | Almond | 134—123 X |
| 3,083,716 | 4/1963 | Rowan et al. | 134—133 X |

CHARLES A. WILLMUTH, *Primary Examiner.*

ROBERT L. BLEUTGE, *Examiner.*

UNITED STATES PATENT OFFICE
CERTIFICATE OF CORRECTION

Patent No. 3,361,143                  January 2, 1968

John L. Daum et al.

It is certified that error appears in the above identified patent and that said Letters Patent are hereby corrected as shown below:

Column 3, line 16, strike out "is" and insert instead -- has --; column 8, line 41, for "the", first occurrence, read -- they --; column 10, line 36, after "one" insert -- end --; column 13, line 7, for "flow and fluid" read -- flow of fluid --.

Signed and sealed this 15th day of July 1969.

(SEAL)
Attest:

Edward M. Fletcher, Jr.                 WILLIAM E. SCHUYLER, JR.
Attesting Officer                         Commissioner of Patents